March 19, 1935.  C. H. HESSLER  1,995,249
NONSKID DEVICE FOR MOTOR VEHICLES
Filed Nov. 1, 1932  2 Sheets-Sheet 1
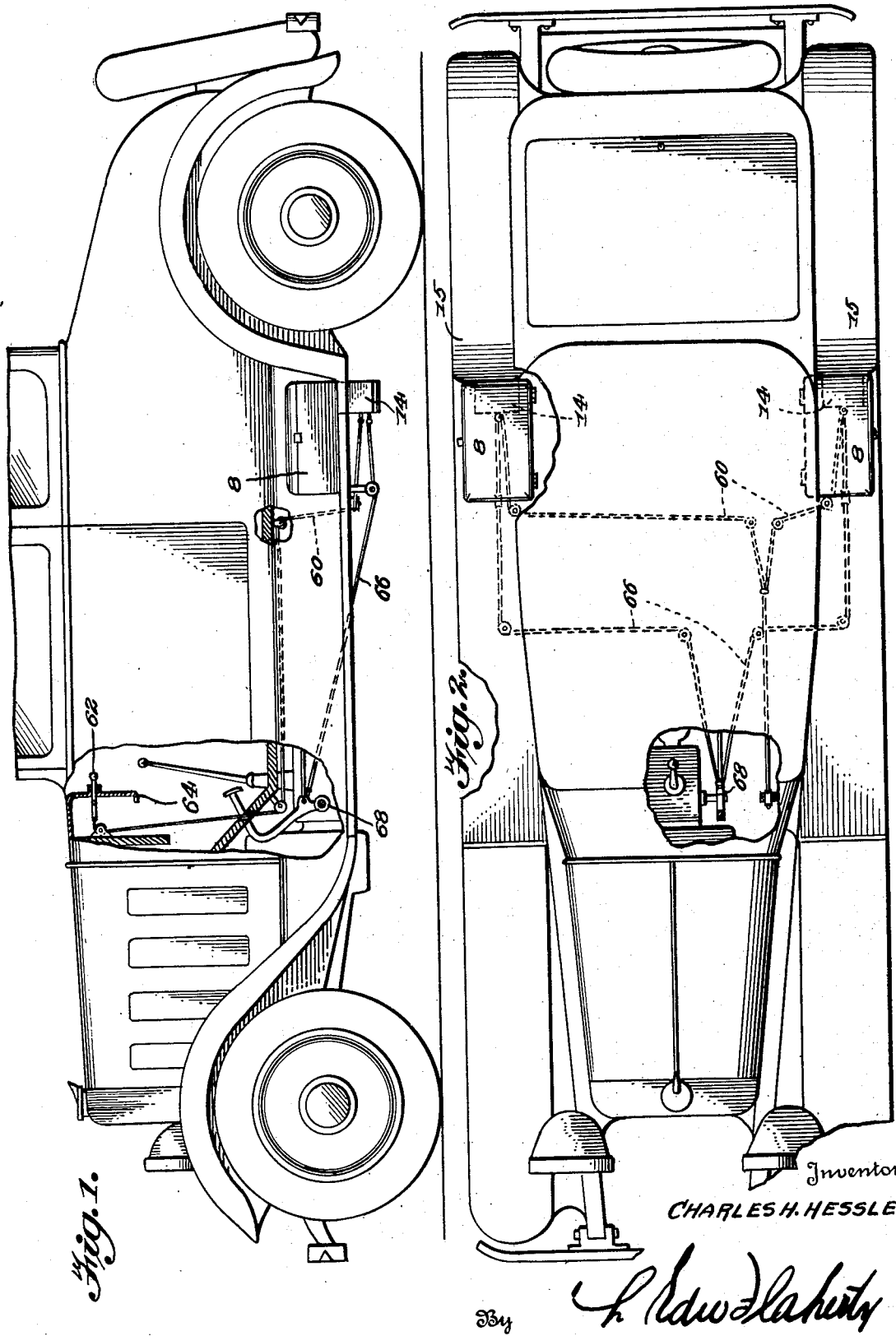
Inventor
CHARLES H. HESSLER
By
L. Edw. Flaherty
Attorney March 19, 1935.  C. H. HESSLER  1,995,249
NONSKID DEVICE FOR MOTOR VEHICLES
Filed Nov. 1, 1932  2 Sheets-Sheet 2
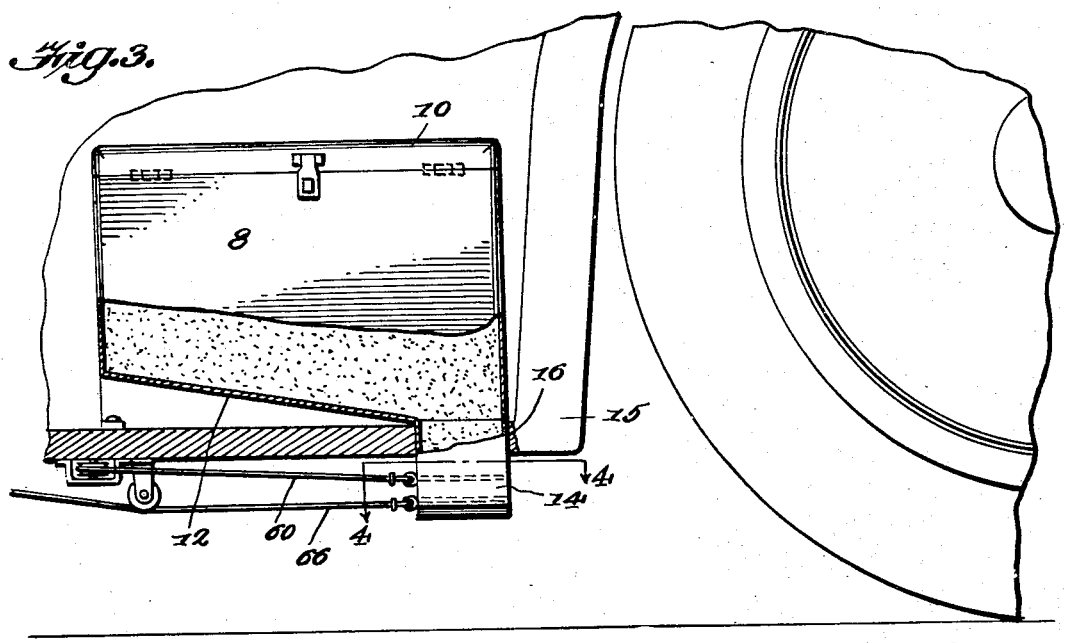
Inventor
CHARLES H. HESSLER Patented Mar. 19, 1935

1,995,249

UNITED STATES PATENT OFFICE 1,995,249

NONSKID DEVICE FOR MOTOR VEHICLES

Charles H. Hessler, Dayton, Ohio

Application November 1, 1932, Serial No. 640,693

1 Claim. (Cl. 291—15)

The present invention relates to a sander and more particularly to a track sander which is specifically adapted for use in connection with preventing skidding of motor vehicles or the like.

One of the objects of the present invention is to provide a sanding device especially adapted for motor vehicles which is actuated by the brake pedal of the motor vehicle.

A further important object of the invention is to provide a dash actuated control for cutting off and on the supply of sand to the end that the brake may be actuated in normal weather conditions without depositing sand in the path of the wheels of the motor vehicle.

The present invention contemplates the provision of a box-like sand container adapted to be disposed on each of the running boards and having a depending spout portion extending therethrough in front of the rear wheels in which there is provided a pair of slidable shutters which are actuated respectively from a control on the dash and the brake pedal to control the flow of sand from the spout in the path of the rear wheels to prevent skidding and to assist in the braking action of the vehicle.

In the accompanying drawings forming a part of this application wherein corresponding reference numerals designate corresponding parts throughout the same, Figure 1 is a side elevational view of a motor vehicle illustrating the manner in which the device is connected to the vehicle, Figure 2 is a top plan view partly in section, Figure 3 is a side elevational view partly in section illustrating the manner in which the box-like sand container is secured to the running board of the motor vehicle, Figure 4 is a horizontal sectional view of the sand chute taken on line 4—4 of Figure 3, Figure 5 is a vertical sectional view of Figure 4, taken on line 5—5, Figure 6 is a vertical sectional view taken on line 6—6 of Fig. 4, Figure 7 is a vertical sectional view of the chute taken on line 7—7 of Figure 6, and Figure 8 is a detailed view of the lower shutter.

In the drawings, wherein for the purpose of illustration there is shown a preferred embodiment of the invention, the numeral 8 generally designates a rectangular shaped box-like container which is adapted to contain the sand. The box is provided with a lid 10 and a downwardly slanting bottom 12 forming one side of a depending spout portion 14. The sand boxes 8 are securely fastened to each side of the running board adjacent the rear fenders 15 and the spout 14 extends through an aperture 16 in the running board thereby permitting the sand which falls through the spout to fall onto the slippery ground or pavement formed by the ice, sleet, or the like, directly in front of the rear wheels.

The spout 14 is provided with a bottom 18 having therein a plurality of spaced transversely extending apertures 20, and at substantially its mid-points is provided with a longitudinally extending integral depending channel 22 which protending integral depending channel 22 which provides a housing for the tension spring the purpose of which will be more fully hereinafter described.

The spout 14 is also provided with a false bottom 24 which has a plurality of transversely extending apertures 26 disposed therein directly above the apertures 20 in the bottom 18 and directly opposite the longitudinally extending channel 22 there is provided a similar upstanding longitudinally extending channel or housing 28. It will thus be noted that the spaced false bottom 24 provides a compartment 30 into which the sand falls from the box 8 before reaching the wet pavement or icy surface. On each side of the spout 14 there is secured by means of screws or the like, a pair of U-shaped guides 32 and 34 which are spaced from the lower and upper sides of the false bottom 24 and the bottom 18 respectively defining guide ways or tracks in which the shutters 36 and 38 slide.

The shutter 36 disposed directly beneath the false bottom 24 is provided with a plurality of spaced apertures 40 which in the normal closed position of the shutter as clearly illustrated in Figure 4, are disposed directly to the rear of the apertures 24.

The shutter is maintained in its normal closed position by means of a coil spring 42 secured at one end to a ring 43 pressed out of the front portion of the shutter and to a similar ring 48 on the inner side of the rear of the spout 14. As is clearly illustrated in Figures 5 and 7 the spring is enclosed by the housing 28 and the shutter to the end that the same does not at any time contact the sand either in the spout or in the compartment 30. This construction not only prolongs the life of the spring but obviously prevents the shutter from sticking or from being normally held out of its closed position due to the collection of sand and the like between the convolutions of the spring.

A second shutter 38 is slidable in the guide way above the bottom 18 and as illustrated in Fig. 8 is provided with a U-shaped opening in the rear thereof, the forward edge of which in the normal closed position of the shutter lies, as illustrated in Fig. 4, to the rear of the opening 20 in the bottom 18 of the spout to prevent the flow of sand from the compartment 30.

The shutter 38 in the same manner as shutter 36 is normally maintained in its closed inoperative position by the spring 45 which is connected at one end to ring 47 in the shutter and at the other to ring 49 on the rear side of the spout.

The shutters 36 and 38 are slidable through transversely extending slots 54 and 56 in the front portion of the spout 14. Each of the shutters is provided with rings 58 and the upper or dash-controlled shutter 36 has a cord or chain 60 connected thereto which is trained over a plurality of pulleys secured to the chassis and framework of the motor vehicle and connected at the other end to an operating lever 62 which is slidably disposed in the dash 64 of the motor vehicle whereby upon the actuation of the handle 62 the upper shutter 36 is moved forward until the apertures 40 therein register with the apertures 26 in the false bottom permitting sand to fall into the compartment 30.

The lower shutter 38 is actuated by the brake pedal through the medium of a chain, rope, or the like, 66, which is connected at one end to the ring 58 of the shutter and at the other end to the brake pedal 68 and in the same manner as the other chain is trained over a series of pulleys secured to the frame and chassis of the motor vehicle. It will thus be seen that upon actuation of the brake pedal 68 by pressing the same downwardly the shutter 38 is moved forward until the forward edge of the U-shaped opening 50 is in advance of the apertures 20 in the bottom of the spout thereby permitting the sand to pass through the apertures 20 from the compartment 30 directly onto the wet or icy surface in front of the rear wheels of the motor vehicle, thereby preventing skidding or the like, and permitting of a more positive braking action.

In normal weather, when it is not desired and necessary to increase the traction and braking effect by the sand the actuating handle 62 is maintained in its normal inoperative position in which the shutter 36 is so positioned that the apertures in the shutter are out of registering engagement with the apertures in the false bottom 24 thereby preventing sand from flowing into the compartment 30, to the end that the brake may be actuated in the usual manner without permitting the sand to flow from the spout in front of the rear wheels.

In inclement weather, when the streets are slippery as a result of rain or ice, the actuating handle 62 on the dash is pulled forward thereby actuating the shutter to cause the apertures 26 in the false bottom and 40 in the shutter to register, permitting the sand to fall from the chute into the compartment 30 and consequently upon actuation of the brake pedal 68 the shutter 38 is moved forwardly against the tension of the spring, effecting registration of the apertures 20 in the bottom with the openings 50 permitting sand to flow on the icy or slick surface directly in front of the rear wheels. In this connection it is to be noted that the apertures 40 in the dash controlled upper shutter 36 are somewhat larger than the apertures in the false bottom to permit the sand to begin flowing into the compartment 30 upon a slight movement of the actuating handle and also by virtue of the particular U-shaped opening in the brake actuated shutter the sand is permitted to flow from the compartment 30 through the apertures 20 upon a slight depression of the brake pedal rather than necessitating the depression of the pedal to its lowermost position.

It will thus be seen that the dash controlled shutter may be positioned in an operative or inoperative position to permit the normal actuation of the brake pedal without effecting a flow of sand or in inclement or icy weather may be moved to an operative position permitting the sand to flow into the compartment 30 whereby upon actuation of the brake pedal the sand is released from the compartment 30 falling onto the slick or icy surface directly in front of the wheels preventing slipping and insuring a positive braking action.

While there is shown only one preferred embodiment of the invention, it is to be specifically understood that it is capable of various modifications and changes without departing from the spirit of the invention and it is intended therefore that only such limitations shall be imposed thereon as are indicated in the prior art or in the appended claims.

Having thus described the invention, what is claimed is:—

In combination with a motor vehicle, a sand box disposed on the running board having a depending spout portion, a bottom in said spout having a plurality of apertures therein, a false bottom spaced from said bottom, and having a plurality of apertures, a slidable shutter beneath and in slidable engagement with the false bottom having a plurality of apertures therein normally out of registering engagement with the apertures in the false bottom, resilient means disposed in said spout for normally urging said shutter to an inoperative position, means disposed on the dash of the motor vehicle and connected to said shutter for moving said shutter to bring the apertures in the false bottom into or out of registering engagement with the apertures in the shutter, a second slidable shutter slidably engaged with said bottom having an aperture therein normally out of registering engagement with the apertures in the bottom, resilient means disposed in said spout for normally maintaining said second shutter in inoperative position, and means connected to said shutter and the brake pedal of a motor vehicle for effecting a movement of the shutter to operative registering position upon the actuation of the brake, said bottom and said false bottom being provided with offset portions cooperating with said first and second named shutters in defining housings for said first and second named resilient means.

CHARLES H. HESSLER.